United States Patent
Peng et al.

(10) Patent No.: US 11,909,624 B2
(45) Date of Patent: Feb. 20, 2024

(54) COMMUNICATION METHOD, APPARATUS, DEVICE, SYSTEM, AND COMPUTER-READABLE STORAGE MEDIUM

(71) Applicant: Huawei Technologies Co., Ltd., Shenzhen (CN)

(72) Inventors: Tao Peng, Nanjing (CN); Zhouyi Yu, Beijing (CN); Rongrong Hua, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/309,146

(22) Filed: Apr. 28, 2023

(65) Prior Publication Data

US 2023/0261965 A1    Aug. 17, 2023

Related U.S. Application Data

(63) Continuation of application No. PCT/CN2021/128011, filed on Nov. 1, 2021.

(30) Foreign Application Priority Data

Nov. 2, 2020  (CN) .......................... 202011205533.5
Jan. 31, 2021  (CN) .......................... 202110132657.3

(51) Int. Cl.
*H04L 45/02*    (2022.01)
*H04L 41/0895*    (2022.01)
*H04L 41/40*    (2022.01)
*H04L 41/34*    (2022.01)

(52) U.S. Cl.
CPC .......... *H04L 45/04* (2013.01); *H04L 41/0895* (2022.05); *H04L 41/34* (2022.05); *H04L 41/40* (2022.05)

(58) Field of Classification Search
CPC ..... H04L 45/04; H04L 41/0895; H04L 41/40; H04L 41/34
See application file for complete search history.

(56) References Cited

U.S. PATENT DOCUMENTS

| | | | |
|---|---|---|---|
| 2021/0195689 A1* | 6/2021 | Pocha ................. | H04L 41/0894 |
| 2022/0061129 A1* | 2/2022 | Pani ..................... | H04W 76/12 |
| 2023/0300069 A1* | 9/2023 | Allsbrook ............... | H04L 45/48 |
| | | | 370/256 |
| 2023/0300674 A1* | 9/2023 | Kedalagudde ........ | H04W 24/10 |
| | | | 370/230.1 |
| 2023/0308853 A1* | 9/2023 | Ding ....................... | H04W 8/18 |
| | | | 455/418 |

* cited by examiner

*Primary Examiner* — Dhairya A Patel
(74) *Attorney, Agent, or Firm* — Slater Matsil, LLP

(57) ABSTRACT

A communication method, a device, and a system are disclosed. An SF device adds a first location identifier including an identifier of the SF device and an identifier of a first physical port to a received first packet sent by first user equipment, and sends a second packet to which the first location identifier is added to a first UP device. The first UP device sends a third packet to a CP device, and the CP device sends the third packet to a USF device. The USF device interacts with an SDN controller, to enable the SDN controller to deliver a configuration instruction to the corresponding SF device. The first packet may be a DHCP packet or a PPPoE packet, and OPTION82/OPTION18 is added to carry the first location identifier.

20 Claims, 8 Drawing Sheets

COMMUNICATION METHOD, APPARATUS, DEVICE, SYSTEM, AND COMPUTER-READABLE STORAGE MEDIUM

CROSS-REFERENCE TO RELATED APPLICATIONS

This application is a continuation of International Application No. PCT/CN2021/128011, filed on Nov. 1, 2021, which claims priority to Chinese Patent Application No. 202011205533.5, filed on Nov. 2, 2020 and Chinese Patent Application No. 202110132657.3, filed on Jan. 31, 2021. All of the aforementioned patent applications are hereby incorporated by reference in their entireties.

TECHNICAL FIELD

This application relates to the communication field, and in particular, to a communication method, an apparatus, a device, a system, and a computer-readable storage medium.

BACKGROUND

With development of software-defined networking (SDN) and network functions virtualization (NFV) technologies, the metropolitan area network evolves from a conventional network-centric architecture to a data center-centric network architecture, and a conventional network element also evolves from professional to universal. The evolution of the conventional network element device from professional to universal mainly resolves two decouplings: decoupling of control and forwarding, and decoupling of software and hardware.

As a conventional broadband access gateway device, a broadband network gateway (BNG) plays an important role in user broadband access services and scenarios. Main requirements for the BNG device in user access are user authentication, access control, traffic scheduling, and the like. With continuous emergence of various Internet services, requirements for a quantity of user sessions supported by the BNG device, for user access bandwidth, and especially for the ability of the BNG device to provide open and programmable services to the outside continue to increase. Based on these factors, the BNG device uses the SDN/NFV architecture to implement the foregoing two decouplings.

A virtual broadband network gateway (vBNG) includes a virtual broadband network gateway control plane (vBNG-CP) device and a virtual broadband network gateway user plane (vBNG-UP) device. The vBNG-CP device manages a plurality of vBNG-UP devices and schedules users, traffic, and resources between the vBNG-UP devices. Compared with a single node, the vBNG greatly improves device utilization and reliability.

When user equipment accesses a network, traffic of the user equipment needs to be dynamically sent to a proper vBNG-UP device based on specific conditions.

SUMMARY

This application proposes a communication method, an apparatus, a device, a system, and a computer-readable storage medium, to send traffic of a user to a proper vBNG-UP device.

According to a first aspect, a communication method is provided. The method includes: An SF device receives a first packet sent by first user equipment, adds a first location identifier to the first packet to obtain a second packet, and sends the second packet to a first UP device, so that the first UP device sends a third packet to a CP device based on the second packet, where the third packet includes the first location identifier, the first location identifier includes an identifier of the SF device and an identifier of a first physical port, and the first physical port is a port that receives the first packet on the SF device;

the CP device receives the third packet sent by the first UP device, and sends user online information of the first user equipment to a user plane steering function USF device, where the user online information includes a traffic quality requirement, a virtual local area network identifier, and the first location identifier;

the USF device receives the user online information sent by the CP device, determines, based on the user online information, a second UP device meeting the traffic quality requirement, and returns an identifier of the second UP device to the CP device, where the second UP device corresponds to a second sub-interface;

the CP device receives the identifier of the second UP device that is sent by the USF device, and delivers a user entry to the second UP device;

the USF device sends the identifier of the second UP device and/or a second location identifier, and the virtual local area network identifier to a software-defined networking SDN controller; and the SDN controller receives the identifier of the second UP device and/or the second location identifier, and the virtual local area network identifier that are sent by the USF device, and sends, based on the identifier of the second UP device and/or the second location identifier, and the virtual local area network identifier, a configuration instruction to an SF device corresponding to the second location identifier, where the configuration instruction includes an identifier of the second sub-interface and the virtual local area network identifier, and the configuration instruction is used by the SF device corresponding to the second location identifier to configure the virtual local area network identifier to the second sub-interface.

In the method, the SF device adds the first location identifier including the identifier of the SF device and the identifier of the first physical port to the received first packet sent by the first user equipment, and sends the second packet to which the first location identifier is added to the first UP device. The first UP device sends the third packet to the CP device, and the CP device sends the third packet to the USF device. In this way, the USF device can identify a physical port of an SF device from which a user accesses, and the USF device interacts with the SDN controller, to enable the SDN controller to deliver the configuration instruction to the corresponding SF device, so that the corresponding SF device configures the virtual local area network identifier of the first user equipment to the second sub-interface corresponding to the second UP device, so as to transfer user traffic to the second UP device that meets the traffic quality requirement.

In a possible implementation, the SF device corresponding to the second location identifier is the same as the SF device that receives the first packet, the virtual local area network identifier is configured on a first sub-interface of the first physical port, the configuration instruction further includes an identifier of the first sub-interface, and the method further includes: The SF device deletes the virtual local area network identifier configured on the first sub-interface. After the virtual local area network identifier is configured on the second sub-interface, the virtual local area network identifier configured on the first sub-interface is deleted, so that resources are released, and subsequent traffic forwarding is more accurate.

In a possible implementation of the first aspect to the following eighth aspect, the identifier of the first physical port includes a slot identifier and/or a subcard identifier, and a port identifier.

In a possible implementation of the first aspect to the following eighth aspect, the first packet is a DHCP packet, and that the SF device adds a first location identifier to the first packet includes: The SF device adds OPTION82 or OPTION18 to the DHCP packet, and uses OPTION82 or OPTION18 to carry the first location identifier.

In a possible implementation of the first aspect to the following eighth aspect, the first packet is a PPPoE packet. For different types of the first packet, different manners of carrying the first location identifier are used, so that flexibility of implementing the method is higher, and implementability of the solution is ensured.

In a possible implementation, the second location identifier includes the identifier of the second sub-interface.

In a possible implementation, a physical port corresponding to the second sub-interface is the same as the first physical port, or a physical port corresponding to the second sub-interface and the first physical port are different physical ports on the SF device, or a physical port corresponding to the second sub-interface and the first physical port are physical ports on different SF devices. The method provided in this application is not only applied to switching between different sub-interfaces on a same physical port of a same SF device, but also supports switching between sub-interfaces on different physical ports of a same SF device, and also supports switching between different sub-interfaces on different SF devices. Therefore, an application scope is wider.

According to a second aspect, a packet sending method is provided. The method is applied to an SF device, and the method includes: The SF device receives a first packet sent by first user equipment; the SF device adds a first location identifier to the first packet to obtain a second packet, where the first location identifier includes an identifier of the SF device and an identifier of a first physical port, and the first physical port is a port that receives the first packet; and the SF device sends the second packet to a first user plane UP device in a vBNG.

In a possible implementation, after the SF device sends the second packet to the first user plane UP device in the vBNG, the method further includes: The SF device receives a configuration instruction sent by a software-defined networking SDN controller, where the configuration instruction includes an identifier of a second sub-interface and a virtual local area network identifier; and the SF device configures the virtual local area network identifier to the second sub-interface.

In a possible implementation, the second sub-interface corresponds to a second UP device, and the method further includes: The SF device receives a fourth packet sent by second user equipment, where the fourth packet includes the virtual local area network identifier; and the SF device sends the fourth packet to the second UP device based on the virtual local area network identifier.

In a possible implementation, the virtual local area network identifier is configured on the first sub-interface, the configuration instruction further includes an identifier of the first sub-interface, and the method further includes: The SF device deletes the virtual local area network identifier configured on the first sub-interface.

According to a third aspect, a communication method is provided, where the method is applied to a control plane CP device, and the method includes:

the CP device receives a third packet sent by a first user plane UP device, where the third packet includes a first location identifier, the first location identifier includes an identifier of a steering function SF device and an identifier of a first physical port, and the first physical port is a port, on the SF device, that receives a first packet sent by first user equipment;

the CP device sends user online information of the first user equipment to a user plane steering function USF device, where the user online information includes a traffic quality requirement, a virtual local area network identifier, and the first location identifier;

the CP device receives an identifier of a second UP device that meets the traffic quality requirement and that is determined by the USF device based on the user online information; and the CP device delivers a user entry to the second UP device.

According to a fourth aspect, a communication method is provided, where the method is applied to a user plane steering function USF device, and the method includes:

the USF device receives user online information of first user equipment sent by a control plane CP device, where the user online information includes a traffic quality requirement, a virtual local area network identifier, and a first location identifier, and the first location identifier includes an identifier of a steering function SF device and an identifier of a first physical port on the SF device;

the USF device determines, based on the user online information, a second UP device meeting the traffic quality requirement, and returns an identifier of the second UP device to the CP device; and the USF device sends the identifier of the second UP device and/or a second location identifier, and the virtual local area network identifier to a software-defined networking SDN controller.

In a possible implementation, the second location identifier includes an identifier of the second sub-interface.

According to a fifth aspect, a communication method is provided, where the method is applied to an SDN controller, and the method includes:

the SDN controller receives an identifier of a second user plane UP device and/or a second location identifier, and a virtual local area network identifier that are sent by a user plane steering function USF device, where the second UP device corresponds to a second sub-interface; and the SDN controller sends, based on the identifier of the second UP device and/or the second location identifier, and the virtual local area network identifier, a configuration instruction to an SF device corresponding to the second location identifier, where the configuration instruction includes an identifier of the second sub-interface and the virtual local area network identifier, and the configuration instruction is used by the SF device corresponding to the second location identifier to configure the virtual local area network identifier to the second sub-interface.

In a possible implementation, the second location identifier includes the identifier of the second sub-interface.

In a possible implementation, the method further includes: The SDN controller determines the second sub-interface based on the identifier of the second UP device that is sent by the USF device.

According to a sixth aspect, a communication apparatus is provided, the apparatus is applied to a steering function SF device, and the apparatus includes:

a transceiver module, configured to receive a first packet sent by first user equipment; and a processing module, configured to add a first location identifier to the first packet to obtain a second packet, where the first location identifier includes an identifier of the SF device and an identifier of a first physical port, and the first physical port is a port that receives the first packet, where the transceiver module is further configured to send the second packet to a first user plane UP device in a virtual broadband network gateway vBNG.

In a possible implementation, the transceiver module is further configured to receive a configuration instruction sent by a software-defined networking SDN controller, where the configuration instruction includes an identifier of a second sub-interface and a virtual local area network identifier; and the processing module is further configured to configure the virtual local area network identifier to the second sub-interface.

In a possible implementation, the second sub-interface corresponds to a second UP device, and the transceiver module is further configured to: receive a fourth packet sent by second user equipment, where the fourth packet includes the virtual local area network identifier; and send the fourth packet to the second UP device based on the virtual local area network identifier.

In a possible implementation, the virtual local area network identifier is configured on the first sub-interface, the configuration instruction further includes an identifier of the first sub-interface, and the processing module is further configured to delete the virtual local area network identifier configured on the first sub-interface.

According to a seventh aspect, a communication apparatus is provided, where the apparatus is applied to a CP device, and the apparatus includes:

a first transceiver module, configured to receive a third packet sent by a first user plane UP device, where the third packet includes a first location identifier, the first location identifier includes an identifier of a steering function SF device and an identifier of a first physical port, and the first physical port is a port, on the SF device, that receives a first packet sent by first user equipment; and a second transceiver module, configured to send user online information of the first user equipment to a user plane steering function USF device, where the user online information includes a traffic quality requirement, a virtual local area network identifier, and the first location identifier, where the second transceiver module is further configured to receive an identifier of a second UP device that meets the traffic quality requirement and that is determined by the USF device based on the user online information; and the first transceiver module is further configured to deliver a user entry to the second UP device.

According to an eighth aspect, a communication apparatus is provided, where the apparatus is applied to a USF device, and the apparatus includes:

a transceiver module, configured to receive user online information of first user equipment sent by a control plane CP device, where the user online information includes a traffic quality requirement, a virtual local area network identifier, and a first location identifier, and the first location identifier includes an identifier of a steering function SF device and an identifier of a first physical port on the SF device; and a processing module, configured to determine, based on the user online information, a second UP device meeting the traffic quality requirement, where the transceiver module is further configured to return an identifier of the second UP device to the CP device; and the transceiver module is further configured to send the identifier of the second UP device and/or a second location identifier, and the virtual local area network identifier to a software-defined networking SDN controller.

In a possible implementation, the apparatus is applied to a software-defined networking SDN controller, and the apparatus includes:

a first transceiver module, configured to receive an identifier of a second user plane UP device and/or a second location identifier, and a virtual local area network identifier that are sent by a user plane steering function USF device, where the second UP device corresponds to a second sub-interface; and a second transceiver module, configured to send, based on the identifier of the second UP device and/or the second location identifier, and the virtual local area network identifier, a configuration instruction to an SF device corresponding to the second location identifier, where the configuration instruction includes an identifier of the second sub-interface and the virtual local area network identifier, and the configuration instruction is used by the SF device corresponding to the second location identifier to configure the virtual local area network identifier to the second sub-interface.

According to a ninth aspect, a communication system is provided, where the communication system includes an SF device, a CP device, a UP device, a USF device, and an SDN controller.

The SF device is configured to perform the method according to any one of the second aspect.

The CP device is configured to perform the method according to any one of the third aspect.

The USF device is configured to perform the method according to any one of the fourth aspect.

The SDN controller is configured to perform the method according to any one of the fifth aspect.

According to a tenth aspect, a communication device is provided, including a processor. The processor is configured to execute instructions, to enable the network device to perform the method according to any one of the first aspect or the possible implementations of the first aspect.

According to an eleventh aspect, a computer-readable storage medium is provided, including instructions. When the instructions are executed on a computer, the computer is enabled to perform the method according to any one of the first aspect or the possible implementations of the first aspect.

According to a twelfth aspect, a communication system is provided. The communication system includes an SF device, a CP device, a UP device, a USF device, and an SDN controller. The SF device, the CP device, the USF device, and the SDN controller respectively perform methods performed by devices of corresponding roles in the method according to any one of the first aspect or the possible implementations of the first aspect.

DETAILED DESCRIPTION OF ILLUSTRATIVE EMBODIMENTS

The following describes embodiments of the present invention with reference to accompanying drawings.

As a BNG device implements decoupling of control and forwarding and decoupling of software and hardware based on an SDN/NFV architecture, a vBNG emerges. The vBNG includes a vBNG-CP device and a vBNG-UP device. The vBNG-CP device manages a plurality of vBNG-UP devices and schedules users, traffic, and resources between the plurality of vBNG-UP devices. Compared with a single node, the vBNG can greatly improve device utilization and reliability. In this embodiment of this application, the vBNG-CP device may also be briefly referred to as a CP device, and the vBNG-UP device may also be briefly referred to as a UP device. There are three types of interfaces between the vBNG-CP device and the vBNG-UP device, which are respectively as follows:

PRi: service interface. After receiving a user access protocol packet, the vBNG-UP device encapsulates and sends, through this interface, the packet to the vBNG-CP for processing.

Mi: management interface. The vBNG-CP device uses this interface to deliver configurations to the vBNG-UP device, and the vBNG-UP device uses this interface to report some running statuses.

SCi: control interface. The vBNG-CP device processes the user access protocol packet and completes protocol exchange with a user. After the user goes online, the vBNG-CP device delivers a user entry to a corresponding vBNG-UP device through this interface.

As a virtual network function (VNF) device, the vBNG-CP device can run on an X86 server to implement virtualization. There are two types of vBNG-UP devices: One is a virtual UP device (vUP device) that can run on an X86 server, and the other is a physical UP device (pUP device), such as a conventional hardware network device.

The vBNG-CP device can manage many vBNG-UP devices, and users are all managed by the vBNG-CP device. Therefore, users can be flexibly scheduled between vBNG-UP devices based on a quantity of user sessions and a traffic load status.

Figure 1:
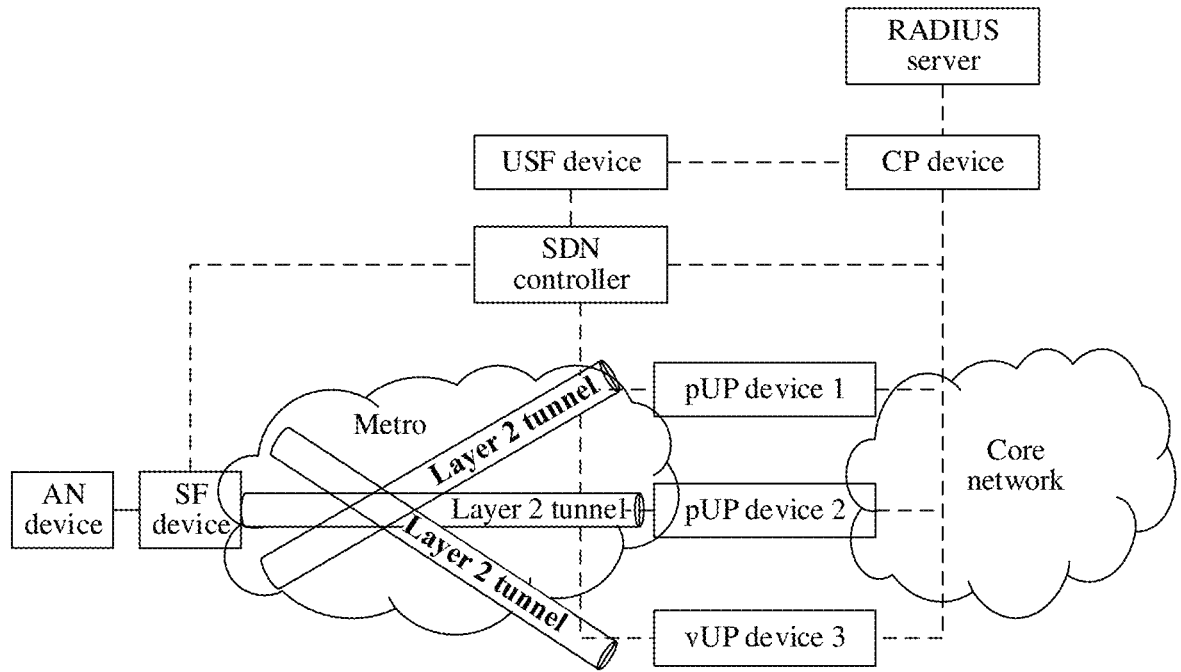
FIG. 1 is a schematic diagram of networking according to an embodiment of the present invention.

In the network shown in FIG. 1, vBNG-UP devices (for example, a pUP device 1, a pUP device 2, and a pUP device 3 in FIG. 1) may be distributed at an edge of the network, or may be distributed at a relatively high location on the network. To enable a user to dynamically select a vBNG-UP device for access, a vBNG-CP device needs to work with an SDN controller (controller) to implement dynamic user migration.

As shown in FIG. 1, a steering function (SF) device exists between an access network (AN) device and the vBNG-UP devices, and a Layer 2 tunnel is established between the SF device and each of the vBNG-UP devices. A physical port between the SF device and the AN device is divided into different sub-interfaces, and the different sub-interfaces are respectively corresponding to the Layer 2 (Lay2) tunnels of the different vBNG-UP devices. In an example in which a user goes online from the pUP device 1 by default, the pUP device 1 forwards a user protocol packet to the vBNG-CP device, and the vBNG-CP device sends user online information (for example, including a user identifier, service level agreement (SLA) information, and online location information) to a UP steering function (USF) device. If the USF device determines, based on the user online information, that the user should access the network through the pUP device 2, the USF device notifies the vBNG-CP device to deliver the user entry to the pUP device 2. In addition, the USF device notifies the SDN controller to configure the SF device, and configure a virtual local area network (VLAN)/double-layer VLAN (802.1Q in 802.1Q, QinQ) identifier corresponding to the user to a sub-interface that is between the SF device and the AN device and that corresponds to the pUP device 2. Then, the SF device directly forwards a subsequent packet of the user to the pUP device 2 through the Layer 2 tunnel between the SF device and the pUP device 2.

The USF device is a dynamic migration policy point, and the vBNG-CP device needs to query the USF device to determine a specific BNG-UP device to which a user entry is delivered. In addition, the USF device needs to notify the SDN controller to configure the SF device. It should be noted that the USF device may be built in the vBNG-CP device, or may be built in the SDN controller, or may be an independent network element. If the USF device is built in the SDN controller or the CP device, interaction between the USF device and the SDN controller or the CP device is internal interaction, and sent information or packets are sent internally.

Figure 2:
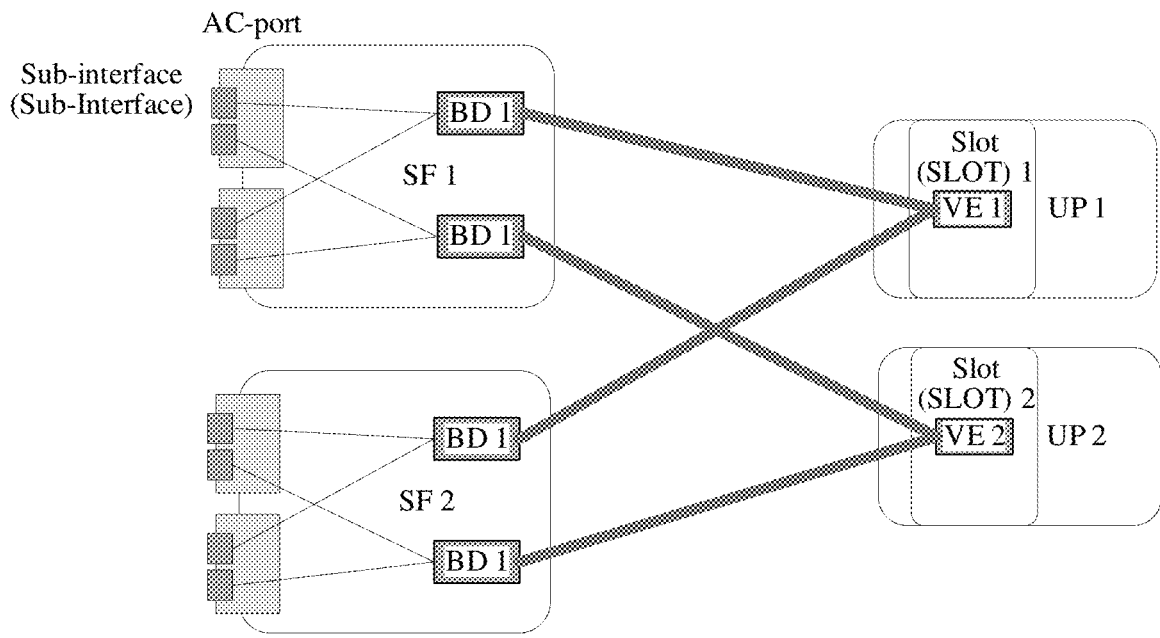
FIG. 2 is a schematic diagram of a connection relationship between SF devices and UP devices according to an embodiment of the present invention.

When a user goes online, the CP device reports an online location of the user on a UP device and a corresponding sub-interface to a remote authentication dial in user service (RADIUS) for precise user binding and source tracing. However, in a steering scenario, a user migrates between go-online sub-interfaces of a plurality of UP devices. As a result, a go-online sub-interface of the user changes, and precise user binding and source tracing cannot be performed. In addition, in a connection relationship between SF devices and UP devices shown in FIG. 2, one SF device has a plurality of physical ports, one physical port has a plurality of sub-interfaces, and different sub-interfaces on one port correspond to different UP devices. For example, one sub-interface corresponds to one UP device. Therefore, when a plurality of SF devices are deployed together, and service traffic of the plurality of SF devices is aggregated to a same UP device, at least one device of a USF device and an SDN controller knows a correspondence between a sub-interface on each SF device and each UP device, but does not know which physical port of which SF device a user accesses. When the USF device and the SDN controller cannot determine the specific physical port of the SF device that the user accesses, migration between different sub-interfaces of the same physical port cannot be performed.

Figure 3A:
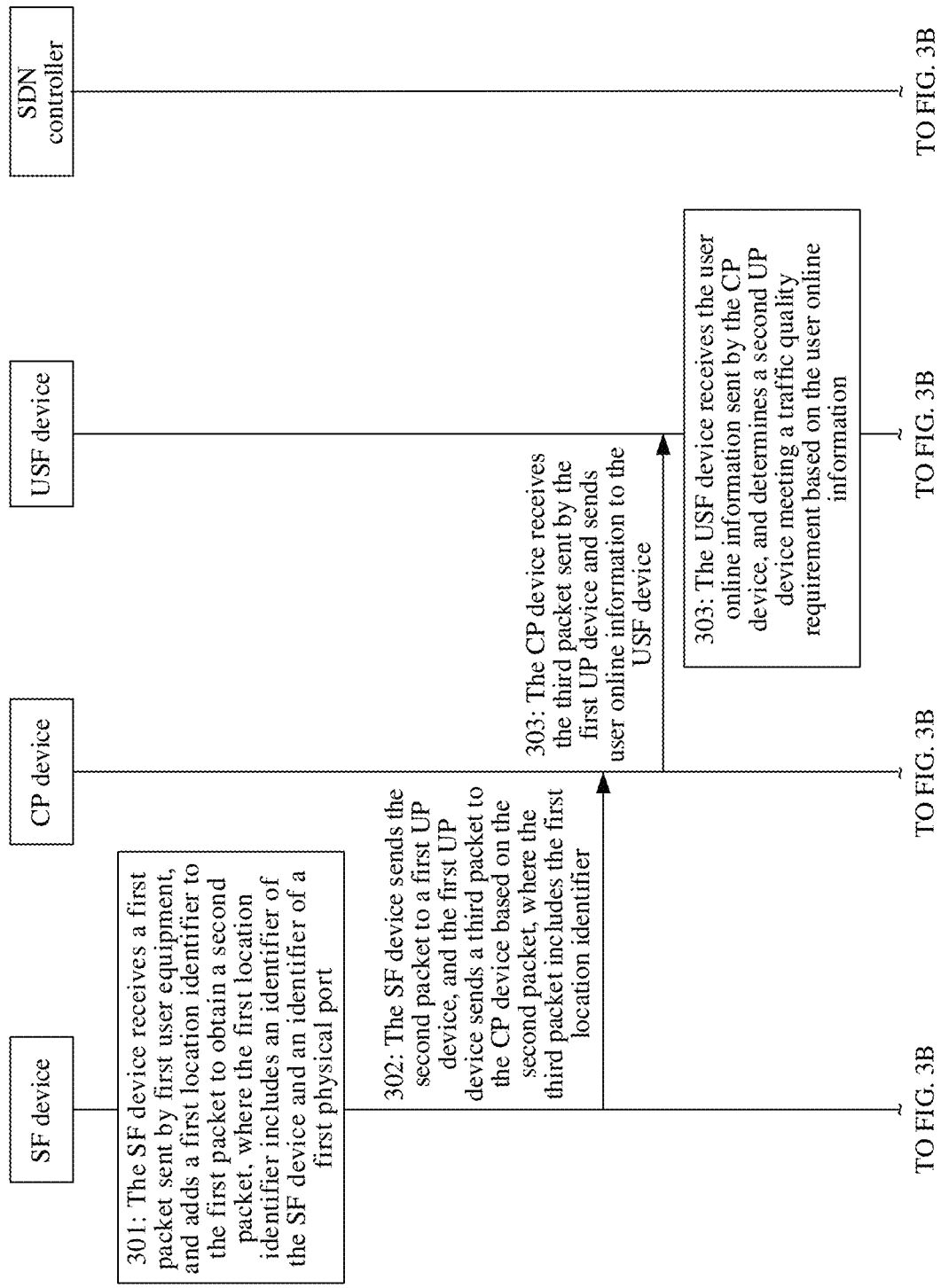
FIG. 3A and FIG. 3B are a schematic diagram of interaction in a communication method according to an embodiment of the present invention.
Figure 3B:
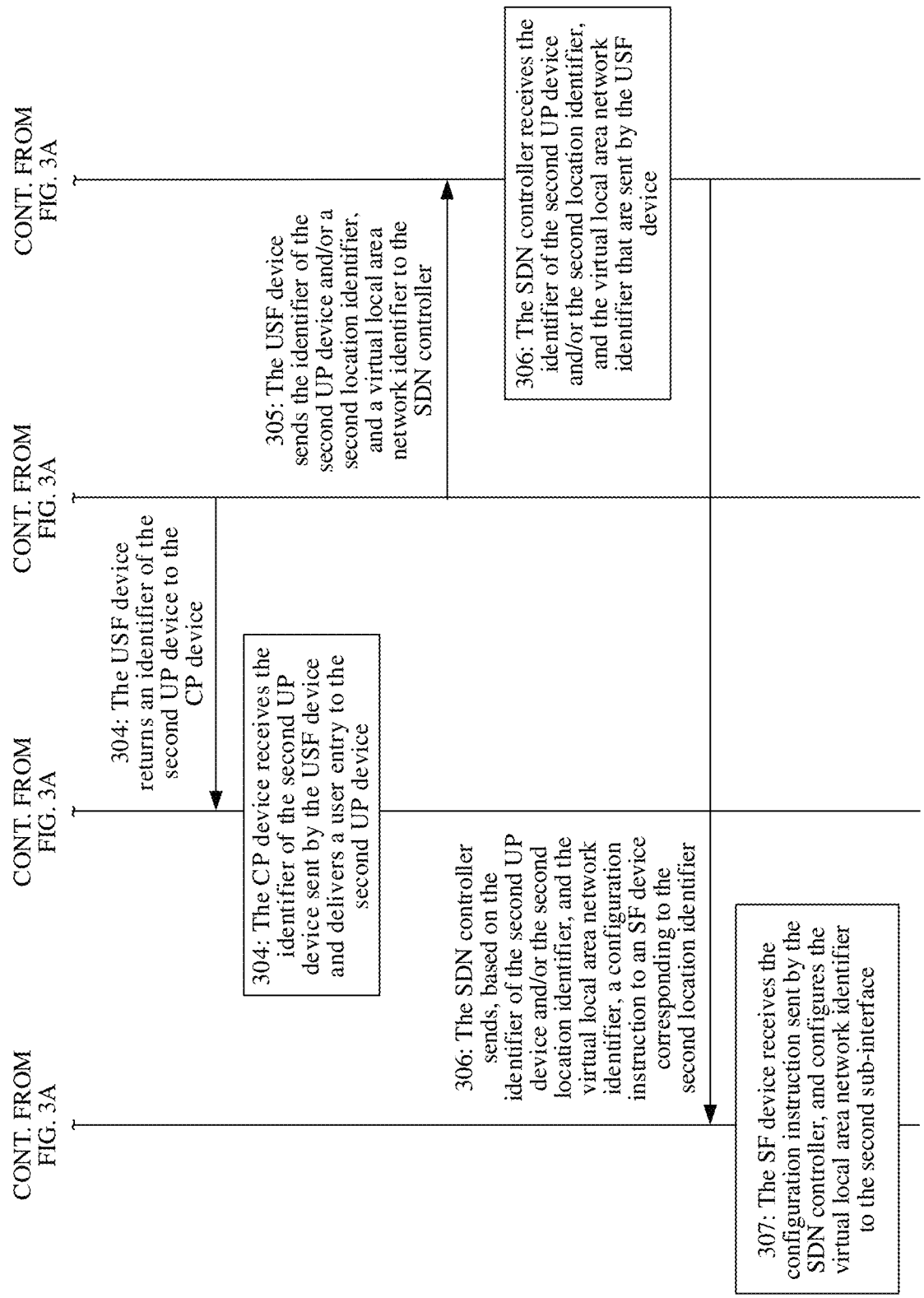

In view of this, an embodiment of this application provides a communication method. With reference to the system shown in FIG. 1, as shown in FIG. 3A and FIG. 3B, the method provided in this embodiment of this application includes the following steps.

301: An SF device receives a first packet sent by first user equipment, and adds a first location identifier to the first packet to obtain a second packet, where the first location identifier includes an identifier of the SF device and an identifier of a first physical port.

The first user equipment is a residential gateway (RGW), for example, a personal computer (PC) or a mobile phone that accesses a home, generally performs network address translation (NAT) processing, allocates a private internet protocol (IP) address to a PC or a mobile phone in the home, performs Point-to-Point Protocol over Ethernet (PPPoE) and IP over Ethernet (IPoE) dialing, obtains an IP address from a vBNG, and performs network access.

The first physical port is a physical port that is on the SF device and that receives the first packet. For example, the identifier of the first physical port includes a slot identifier and/or a subcard identifier, and a port identifier. A receiving location of the first packet, that is, a user access location, can be determined by using the identifier of the first physical port. For example, a specific port (identified by the port identifier) of a specific subcard (identified by the subcard identifier) in a specific slot (identified by the slot identifier) that the first packet accesses can be determined by using the identifier of the first physical port. In this embodiment of this application, a sub-interface used by the SF device to receive the first packet may be a first sub-interface of the first physical port. The first sub-interface is also referred to as a sub-interface before migration, a default sub-interface, or an initial sub-interface. In addition, the first sub-interface is corresponding to a first UP device.

In this embodiment of this application, a type of the first packet and a manner in which the SF device adds the first location identifier are not limited. In a possible implementation, the first packet is a dynamic host configuration protocol (DHCP) packet, and that the SF device adds a first location identifier to the first packet includes: The SF device adds an operation field OPTION82 or OPTION18 to the DHCP device packet, and uses OPTION82 or OPTION18 to carry the first location identifier. In another possible implementation, the first packet is a PPPoE packet, and that the SF device adds a first location identifier to the first packet includes: The SF device adds the first location identifier to the PPPoE packet.

302: The SF device sends the second packet to the first UP device, and the first UP device sends a third packet to a CP device based on the second packet, where the third packet includes the first location identifier.

The first UP device corresponds to the first sub-interface of the first physical port. Because the sub-interface used by the SF device to receive the first packet is the first sub-interface of the first physical port, and the first sub-interface of the first physical port corresponds to the first UP device, the SF device sends the second packet to the first UP device, and the first UP device sends the third packet to the CP device based on the second packet.

In addition, when a user goes online, in addition to sending the first packet (for example, a user dial-up protocol packet) to the first UP device, the SF device further aggregates home terminals, aggregates the user to the first UP device, forwards a Layer 2 packet, and performs VLAN/QinQ isolation for the user. Each user exclusively uses one VLAN/QinQ. QinQ refers to two VLAN identifiers, for example, service VLAN (SVLAN)+customer VLAN (CVLAN). The VLAN/QinQ is corresponding to a default sub-interface when the user initially goes online, for example, the first sub-interface of the first physical port, but may not be configured on the default sub-interface.

303: The CP device receives the third packet sent by the first UP device, and sends user online information to the USF device. The USF device receives the user online information sent by the CP device, and determines, based on the user online information, a second UP device meeting a traffic quality requirement.

The user online information includes the traffic quality requirement, a virtual local area network identifier, and a location identifier. In this step, after the USF device receives the user online information of the corresponding user sent by the CP device, because the user online information includes the traffic quality requirement, the virtual local area network identifier, and the location identifier, the USF device may query an SLA policy, and determine a target vBNG-UP according to the queried SLA policy. For example, a UP device with smallest load in vBNG-UPs matching the SLA is used as the second UP device that meets the traffic quality requirement, for example, the pUP 2 in FIG. 1.

This embodiment of this application does not limit a manner in which the CP device obtains the traffic quality requirement. For example, when a user goes online, the SF device uses a DHCP or PPPoE packet to add a physical access port (or a sub-interface of the physical port) of the user, that is, the first location identifier, to an online packet (the second packet) and sends the online packet to a vBNG-UP device (the first UP device), and the CP device supports parsing OPTION in the online packet during online interaction, obtains a sub-interface of an SF device that the user accesses when going online, and notifies the USF device of this information.

In addition, when the CP device and an authentication server (RADIUS) perform user authentication, the access sub-interface of the SF device can be used as a user location identifier and reported to the RADIUS server for precise binding and user location tracing. In a possible implementation, the CP device sends an authentication request to the authentication server, where the authentication request carries the location identifier; and the CP device receives an authentication response returned by the authentication server, where the authentication response carries a traffic quality requirement corresponding to the location identifier.

In addition, the USF device may further deliver a migration policy to the corresponding SF, and map the port+VLAN/QinQ of the user to a Layer 2 tunnel connected to the corresponding UP device, for example, a virtual extensible local area network (VXLAN), a virtual leased line (VLL), or an Ethernet virtual private network (EVPN). The second UP device corresponds to a second sub-interface. A physical port corresponding to the second sub-interface is the same as the first physical port, or a physical port corresponding to the second sub-interface and the first physical port are different physical ports on the same SF device, or a physical port corresponding to the second sub-interface and the first physical port are physical ports on different SF devices.

304: The USF device returns an identifier of the second UP device to the CP device, and the CP device receives the identifier of the second UP device sent by the USF device, and delivers a user entry to the second UP device.

After receiving the user entry delivered by the CP device, the second UP device locally generates a forwarding entry of the user, performs related service policy execution and traffic forwarding, and advertises a route to the outside.

305: The USF device sends the identifier of the second UP device and/or a second location identifier, and the virtual local area network identifier to an SDN controller.

In a possible implementation, the method further includes: The USF device sends an identifier of the second sub-interface of the SF device to the SDN controller. For example, the second location identifier includes the identifier of the second sub-interface.

The second location identifier may include an identifier of a target SF device and an identifier of a target physical port on the target SF. For example, the physical port corresponding to the second sub-interface is the same as the first physical port; the identifier of the target SF device in the second location identifier is the same as the identifier of the SF device in the first location identifier, and both are the identifier of the SF device that receives the first packet; and the identifier of the target physical port in the second location identifier is the same as the identifier of the first physical port in the first location identifier. For another example, the physical port corresponding to the second sub-interface and the first physical port are different physical ports on the same SF device; the identifier of the target SF device in the second location identifier is the same as the identifier of the SF device in the first location identifier, and both are the identifier of the SF device that receives the first packet; and the identifier of the target physical port in the second location identifier is different from the identifier of the first physical port in the first location identifier. For another example, the physical port corresponding to the second sub-interface and the first physical port are physical ports on different SF devices; the identifier of the target SF device in the second location identifier is different from the identifier of the SF device in the first location identifier; and the identifier of the target physical port in the second location identifier is different from or the same as the identifier of the first physical port in the first location identifier.

In addition, based on different cases of whether the second location identifier includes the identifier of the second sub-interface, information sent by the USF device to the SDN controller includes the following cases.

Case 1: The second location identifier does not include the identifier of the second sub-interface, the information sent by the USF device to the SDN controller includes the identifier of the second UP device, and the SDN controller determines the second sub-interface based on the identifier of the second UP device.

Case 2: The second location identifier includes the identifier of the second sub-interface, and the information sent by the USF device to the SDN controller includes the second location identifier, and does not include the identifier of the second UP device. The SDN controller may determine the second sub-interface based on the identifier of the second sub-interface in the second location identifier.

Case 3: The second location identifier includes the identifier of the second sub-interface, the information sent by the USF device to the SDN controller includes the second location identifier and the identifier of the second UP device, and the SDN controller may determine the second sub-interface based on the identifier of the second sub-interface in the second location identifier, or may determine the second sub-interface based on the identifier of the second UP device.

306: The SDN controller receives the identifier of the second UP device and/or the second location identifier, and the virtual local area network identifier that are sent by the USF device, and sends, based on the identifier of the second UP device and/or the second location identifier, and the virtual local area network identifier, a configuration instruction to the SF device corresponding to the second location identifier.

Because a location identifier includes an identifier of an SF device and an identifier of a physical port, for example, the identifier of the physical port may be represented as a slot identifier+a subcard identifier+a port identifier. The configuration instruction includes the identifier of the second sub-interface and the virtual local area network identifier, and the second sub-interface corresponds to the second UP device. In this way, when there are a plurality of SF devices in the system, and each SF device has a plurality of physical ports connected to an device, the SDN controller can know which SF device interface (physical port and sub-interface) of which SF device is to be configured.

For example, a user originally goes online from a sub-interface 1 (corresponding to a pUP device 1) of a physical port 1 on an SF device 1, and subsequent traffic of the user needs to be switched to a sub-interface 2 (corresponding to a pUP device 2) of the physical port 1 on the SF device 1. The SDN controller sends a configuration instruction to the SF device 1, to configure a VLAN/QinQ identifier to the sub-interface 2 of the physical port 1 on the SF device 1. For another example, a user originally goes online from a sub-interface 1.1 (corresponding to a pUP device 1) of a physical port 1 on an SF device 1, and subsequent traffic of the user needs to be switched to a sub-interface 2.1 (corresponding to a pUP device 2) of a physical port 2 on the SF device 1. The SDN controller sends a configuration instruction to the SF device 1, to configure a VLAN/QinQ identifier to the sub-interface 2.1 of the physical port 2 on the SF device 1. For another example, a user originally goes online from a sub-interface 1.1 (corresponding to a pUP device 1) of a physical port 1 on an SF device 1, and subsequent traffic of the user needs to be switched to a sub-interface 3.1 (corresponding to a pUP device 2) of a physical port 3 on the SF device 2. The SDN controller sends a configuration instruction to the SF device 2, to configure a VLAN/QinQ identifier to the sub-interface 3.1 of the physical port 3 on the SF device 2.

In this step, for a case in which the second location identifier does not include the identifier of the second sub-interface, before the SDN controller sends the configuration instruction to the SF device based on the identifier of the second UP device and/or the second location identifier, and the virtual local area network identifier, the method further includes: The SDN controller determines the second sub-interface based on the identifier of the second UP device.

In this embodiment of this application, an example in which the SF device corresponding to the second location identifier is the SF device receiving the first packet is used. The method provided in this embodiment of this application further includes the following step 307.

307: The SF device receives the configuration instruction sent by the SDN controller, and configures the virtual local area network identifier to the second sub-interface.

In this embodiment of this application, because the configuration instruction includes the identifier of the second sub-interface and the virtual local area network identifier, the SF device configures the virtual local area network identifier to the second sub-interface. In a subsequent communication process, the SF device receives a fourth packet sent by second user equipment, where the fourth packet includes the virtual local area network identifier; and the SF device sends the fourth packet to the second UP device based on the virtual local area network identifier. Optionally, the second user equipment is different from the first user equipment, or the second user equipment may be the same as the first user equipment.

In a possible implementation, if the virtual local area network identifier is configured on the first sub-interface of the first physical port, and the configuration instruction received by the SF device further includes an identifier of the first sub-interface, the method further includes: The SF device deletes the virtual local area network identifier configured on the first sub-interface.

It should be noted that, after the SF device receives the configuration instruction, if the configuration instruction further includes the identifier of the first sub-interface, a sequence of the operation of deleting, by the SF device, the virtual local area network identifier configured on the first sub-interface and the operation of configuring the virtual local area network identifier to the second sub-interface is not limited in this embodiment of this application.

Figure 4:
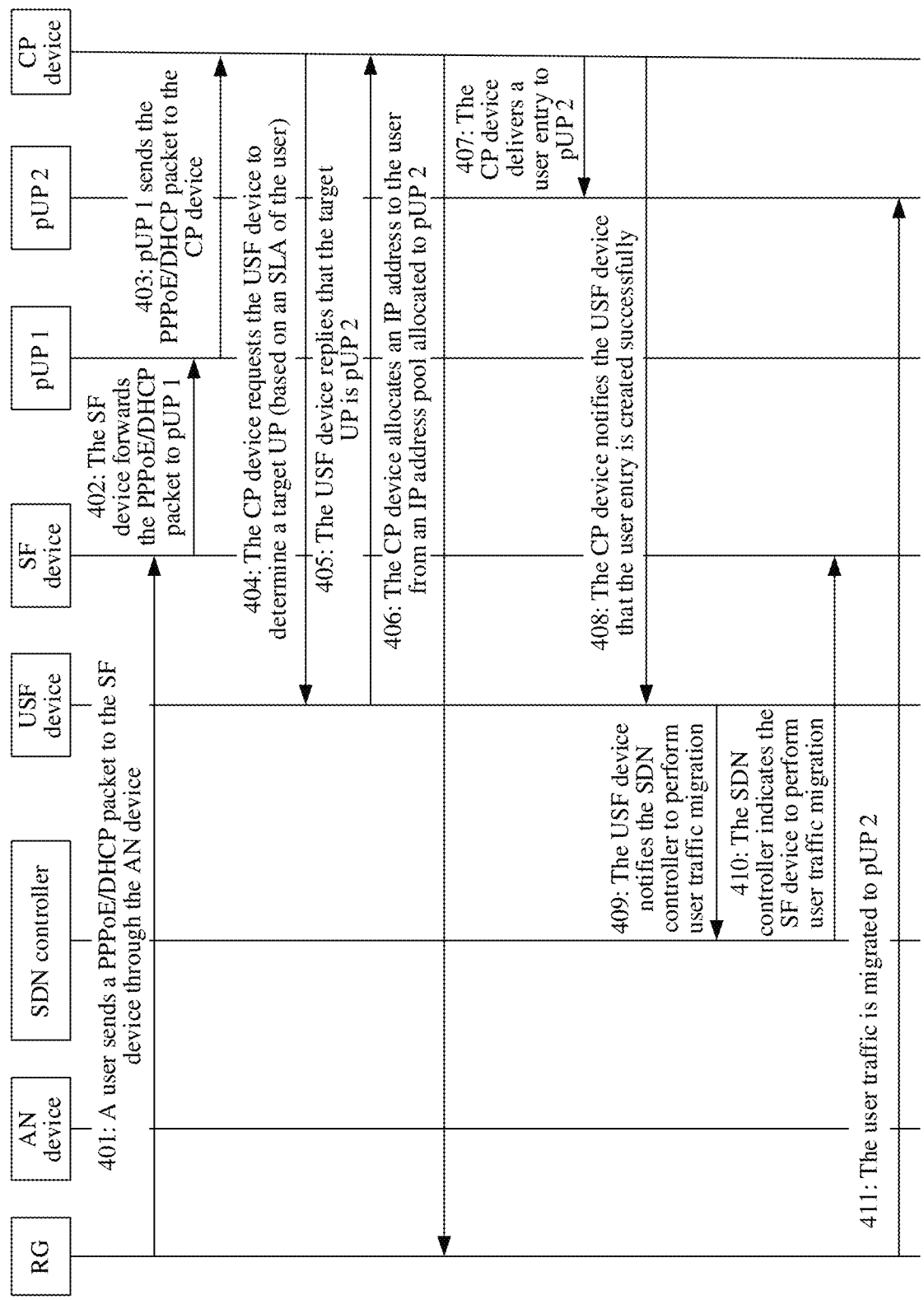
FIG. 4 is a schematic diagram of interaction in another communication method according to an embodiment of the present invention.

Based on the interaction procedure of the method shown in FIG. 3A and FIG. 3B, an example in which the first user equipment is an RG, and the first packet is a PPPoE or DHCP packet is used. As shown in FIG. 4, the communication process includes but is not limited to the following steps.

401: A user sends a PPPoE/DHCP packet to an SF device through an AN device.

402: The SF device forwards the PPPoE/DHCP packet to a pUP 1 device.

403: The pUP 1 device sends the PPPoE/DHCP packet to a CP device.

404: The CP device requests, based on an SLA of the user, a USF device to determine a target UP device.

405: The USF device replies that the target UP device is a pUP 2 device.

406: The CP device allocates, from an IP address pool allocated to the pUP 2 device, an IP address to the user.

407: The CP device delivers a user entry to the pUP 2 device.

408: The CP device notifies the USF device that the user entry is successfully created.

409: The USF device notifies an SDN controller to migrate user traffic.

410: The SDN controller indicates the SF device to migrate the user traffic.

411: The user traffic is migrated to the pUP 2 device.

Figure 5:
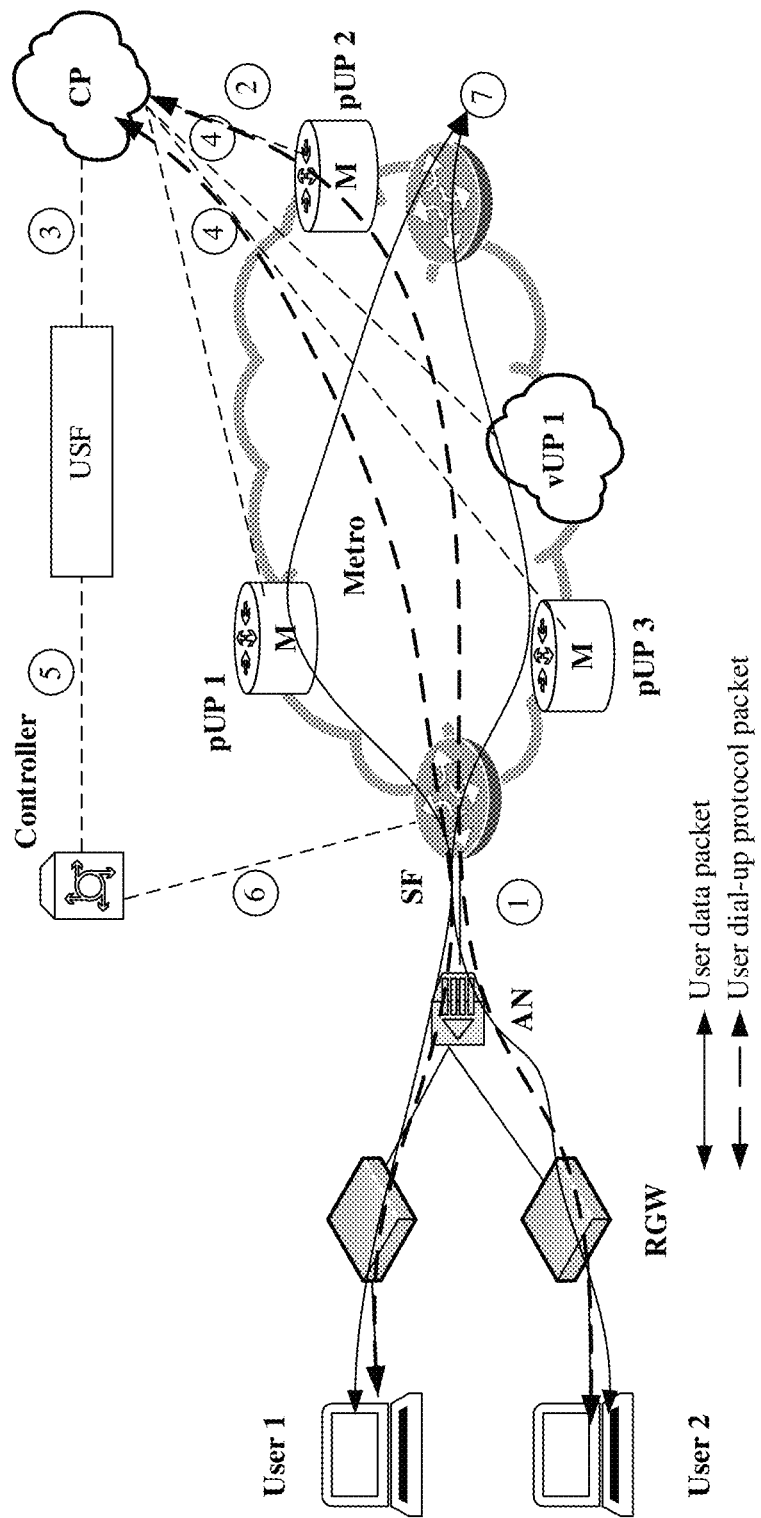
FIG. 5 is a schematic diagram of another type of networking according to an embodiment of the present invention.
Figure 6:
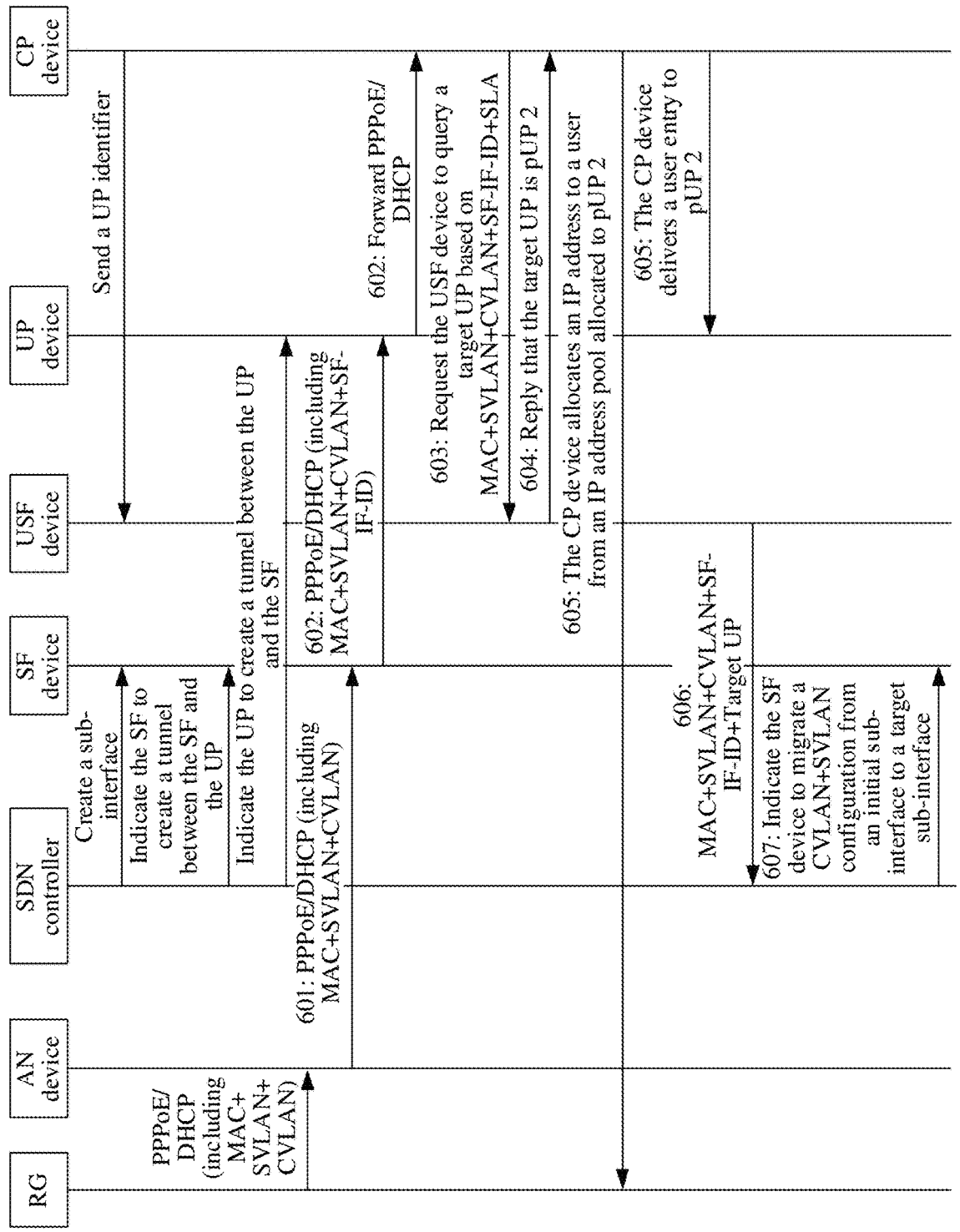
FIG. 6 is a schematic diagram of interaction in a communication method according to an embodiment of the present invention.

For ease of understanding, the communication method provided in this embodiment of this application is described by using a schematic networking diagram shown in FIG. 5 as an example. The method may be shown in FIG. 6. ① to ⑦ in FIG. 5 are respectively corresponding to 601 to 607 in FIG. 6. As shown in FIG. 6, before the communication method provided in this embodiment of this application is performed, an SDN controller notifies an SF device to create a sub-interface, indicates the SF device to create a tunnel between the SF device and a UP device, and indicates the UP device to create a tunnel between the UP device and the SF device. A CP device sends a UP identifier to a USF device. Then, after an RG sends a user dial-up packet to an AN device, the communication method includes but is not limited to the following steps.

601: The SF device adds OPTION82/OPTION18 to the user dial-up packet (for example, a DHCP device packet or a PPPoE packet) forwarded by the AN device, and uses OPTION82/OPTION18 to carry an identifier of an SF device accessed by a user and an identifier of a user-side physical port on the SF device (in FIG. 3A and FIG. 3B, the SF device-IF-ID is used to represent the identifier of the SF device and the identifier of the user-side physical port on the SF device). If the packet is a DHCP device packet, OPTION82 or OPTION18 may be added to carry the identifier of the SF device accessed by the user and the identifier of the user-side physical port on the SF device. If the packet is a PPPoE packet, the identifier of the SF device accessed by the user and the identifier of the user-side physical port on the SF device are carried by using a PPPoE+ technology.

602: Send the dial-up packet to a vBNG-CP device through a default vBNG-UP device (for example, the pUP device 1 in FIG. 1). In this case, CVLAN+SVLAN is not configured on any sub-interface.

603: The vBNG-CP device sends user online information (for example, including a user identifier, service SLA information, and online location information) to the USF device, and requests the USF device to determine a target vBNG-UP device. The vBNG-CP device may obtain the SLA information by using the following process: The vBNG-CP device reports a user authentication request to a Radius Server, and the request carries a user access location. The SLA of the user is identified based on user dial-up authentication response information returned by the Radius Server. The user identifier may be media access control (media access control, MAC)+SVLAN+CVLAN.

604: The USF device queries an SLA policy, and determines a vBNG-UP device that meets an SLA requirement, for example, a vBNG-UP device with smallest load in vBNG-UP devices matching the SLA, that is, a second vBNG-UP device, for example, the pUP device 2 in FIG. 1. Then, the USF device returns an identifier of the second vBNG-UP device to the vBNG-CP device.

605: The vBNG-CP device delivers a user entry to the second vBNG-UP device.

606: The USF device sends the user identifier (for example, MAC+SVLAN+CVLAN), access location information (SF device-IF-ID), and a second UP device identifier to the SDN controller.

607: The SDN controller sends, based on the information sent by the USF device, a configuration instruction to a corresponding SF device, configures a second sub-interface of a physical port of the SF device, and configures CVLAN+SVLAN in the user identifier to the second sub-interface, so as to migrate traffic of the user to the second vBNG-UP device. The second sub-interface may be determined based on the second UP device identifier. The SDN controller can determine that an initial online sub-interface is a default sub-interface by determining that SVLAN+CVLAN is not configured on any sub-interface.

Then, the user traffic is forwarded by using the vBNG-UP device identified by the second UP device identifier.

In the foregoing process, the user traffic is switched from the pUP device 1 to the pUP device 2, the initial sub-interface is the default sub-interface, and the target sub-interface is a sub-interface corresponding to the pUP device 2. In another case, it is assumed that the user traffic continues to be migrated from the pUP device 2 to a vUP device 3 (refer to FIG. 1). In this case, a sub-interface (initial sub-interface) before migration becomes the sub-interface corresponding to the pUP device 2, and the target sub-interface becomes a sub-interface corresponding to the vUP device 3. The SDN Controller may determine, based on SF device-IF-ID and SVLAN+CVLAN in information sent by the NSF device, that the initial sub-interface (the physical port and the sub-interface) is the sub-interface corresponding to the pUP device 2, notify the SF device to delete SVLAN+CVLAN on the sub-interface corresponding to the pUP device 2, and configure the SVLAN+CVLAN to the sub-interface corresponding to the vUP device 3.

After a user goes online through the default sub-interface, the USF device stores a mapping relationship between a user identifier (for example, MAC+SVLAN+CVLAN) and a user online location (for example, an identifier of an SF device where the user initially goes online and an identifier of an initial sub-interface on the SF device). After migration, the USF device changes the mapping relationship to a mapping relationship between the user identifier and a location (for example, an identifier of an SF device and an identifier of a second sub-interface on the SF device) after migration.

The foregoing process describes an implementation in which the SDN Controller determines, based on the information sent by the NSF device, the sub-interface of the SF device that needs to be configured. In another implementation, the USF device may determine an SF device that needs to perform a migration action, an initial sub-interface (a first sub-interface) and a target sub-interface (a second sub-interface) on the SF device, and SVLAN+CVLAN to be migrated, and then send the information to the SDN Controller, so that the SDN Controller delivers a configuration instruction to the SF device.

According to the technical solutions provided in the embodiments of the present invention, the user traffic may be migrated, based on the user information (for example, user SLA information), from the pUP device 1 to the pUP device 2 that matches the SLA. The SF device adds OPTION82/OPTION18 to the received user dial-up packet (for example, a DHCP device packet or a PPPoE packet) forwarded by the AN device, and uses OPTION82/OPTION18 to carry the identifier of the SF device accessed by the user and the identifier of the user-side physical port on the SF device, so that the technical solutions can be implemented.

Figure 7:
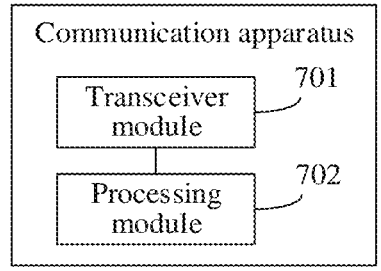
FIG. 7 is a schematic diagram of a structure of a communication apparatus according to an embodiment of the present invention.

Refer to FIG. 7. An embodiment of this application provides a communication apparatus. The apparatus is applied to an SF device. Based on the following plurality of modules shown in FIG. 7, the communication apparatus shown in FIG. 7 can perform all or some operations performed by the SF device. It should be understood that the apparatus may include more additional modules than the shown modules or omit some of the shown modules. This is not limited in this embodiment of this application. The apparatus includes:

a transceiver module 701, configured to receive a first packet sent by first user equipment; and a processing module 702, configured to add a first location identifier to the first packet to obtain a second packet, where the first location identifier includes an identifier of the SF device and an identifier of a first physical port, and the first physical port is a port that receives the first packet.

The transceiver module 701 is further configured to send the second packet to a first UP device in a vBNG.

In a possible implementation, the transceiver module 701 is further configured to receive a configuration instruction sent by an SDN controller, where the configuration instruction includes an identifier of a second sub-interface and a virtual local area network identifier.

The processing module 702 is further configured to configure the virtual local area network identifier to the second sub-interface.

In a possible implementation, the second sub-interface corresponds to a second UP device. The transceiver module 701 is further configured to: receive a fourth packet sent by second user equipment, where the fourth packet includes the virtual local area network identifier; and send the fourth packet to the second UP device based on the virtual local area network identifier.

In a possible implementation, the virtual local area network identifier is configured on the first sub-interface, the configuration instruction further includes an identifier of the first sub-interface, and the processing module 702 is further configured to delete the virtual local area network identifier configured on the first sub-interface.

In a possible implementation, the identifier of the first physical port includes a slot identifier and/or a subcard identifier, and a port identifier.

In a possible implementation, the first packet is a dynamic host configuration protocol DHCP packet, and the processing module 702 is configured to: add OPTION82 or OPTION18 to the DHCP packet, and use OPTION82 or OPTION18 to carry the first location identifier.

In a possible implementation, the first packet is a Point-to-Point Protocol over Ethernet PPPoE packet, and the processing module 702 is configured to add the first location identifier to the PPPoE packet.

Figure 8:
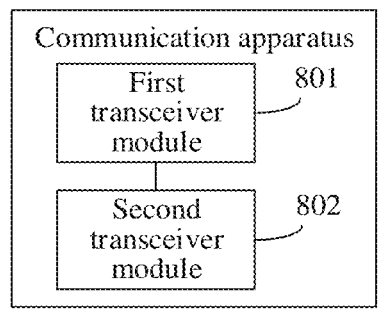
FIG. 8 is a schematic diagram of a structure of a communication apparatus according to an embodiment of the present invention.

Refer to FIG. 8. An embodiment of this application provides a communication apparatus. The apparatus is applied to a CP device. Based on the following plurality of modules shown in FIG. 8, the communication apparatus shown in FIG. 8 can perform all or some operations performed by the CP device. It should be understood that the apparatus may include more additional modules than the shown modules or omit some of the shown modules. This is not limited in this embodiment of this application. The apparatus includes:

a first transceiver module 801, configured to receive a third packet sent by a first UP device, where the third packet includes a first location identifier, the first location identifier includes an identifier of an SF device and an identifier of a first physical port, the first UP device corresponds to a first sub-interface of the first physical port, and the first physical port is a port, on the SF device, that receives a first packet sent by first user equipment; and a second transceiver module 802, configured to send user online information of the first user equipment to a USF device, where the user online information includes a traffic quality requirement, a virtual local area network identifier, and the first location identifier.

The second transceiver module 802 is further configured to receive an identifier of a second UP device that meets the traffic quality requirement and that is determined by the USF device based on the user online information.

The first transceiver module 801 is further configured to deliver a user entry to the second UP device.

Figure 9:
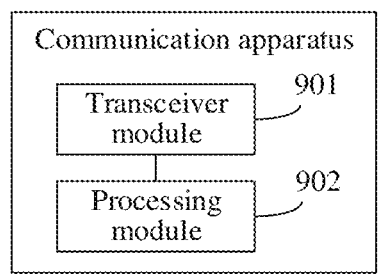
FIG. 9 is a schematic diagram of a structure of a communication apparatus according to an embodiment of the present invention.

Refer to FIG. 9. An embodiment of this application provides a communication apparatus. The apparatus is applied to a USF device. Based on the following plurality of modules shown in FIG. 9, the communication apparatus shown in FIG. 9 can perform all or some operations performed by the USF device. It should be understood that the apparatus may include more additional modules than the shown modules or omit some of the shown modules. This is not limited in this embodiment of this application. The apparatus includes:

a transceiver module 901, configured to receive user online information of first user equipment sent by a CP device, where the user online information includes a traffic quality requirement, a virtual local area network identifier, and a first location identifier, and the first location identifier includes an identifier of a steering function SF device and an identifier of a first physical port on the SF device; and a processing module 902, configured to determine, based on the user online information, a second UP device meeting the traffic quality requirement.

The transceiver module 901 is further configured to return an identifier of the second UP device to the CP device, where the second UP device corresponds to a second sub-interface.

The transceiver module 901 is further configured to send the identifier of the second UP device and/or a second location identifier, and the virtual local area network identifier to an SDN controller.

Figure 10:
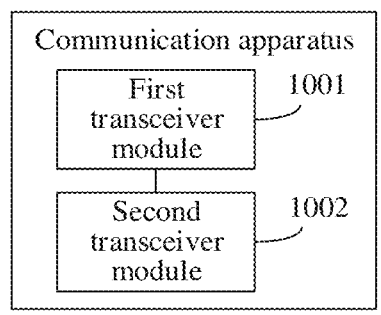
FIG. 10 is a schematic diagram of a structure of a communication apparatus according to an embodiment of the present invention.

Refer to FIG. 10. An embodiment of this application provides a communication apparatus. The apparatus is applied to an SDN controller. Based on the following plurality of modules shown in FIG. 10, the communication apparatus shown in FIG. 10 can perform all or some operations performed by the SDN controller. It should be understood that the apparatus may include more additional modules than the shown modules or omit some of the shown modules. This is not limited in this embodiment of this application. The apparatus includes:

a first transceiver module 1001, configured to receive an identifier of a second UP device and/or a second location identifier, and a virtual local area network identifier that are sent by a USF device, where the second UP device corresponds to a second sub-interface; and a second transceiver module 1002, configured to send, based on the identifier of the second UP device and/or the second location identifier, and the virtual local area network identifier, a configuration instruction to an SF device corresponding to the second location identifier, where the configuration instruction includes an identifier of the second sub-interface and the virtual local area network identifier, and the configuration instruction is used by the SF device corresponding to the second location identifier to configure the virtual local area network identifier to the second sub-interface.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the embodiment accompanying drawings of the first network node or the controller provided in the present invention, a connection relationship between modules indicates that there is a communication connection between the modules, and the communication connection may be specifically implemented as one or more communication buses or signal cables. A person of ordinary skill in the art may understand and implement embodiments of the present invention without creative efforts.

Figure 11:
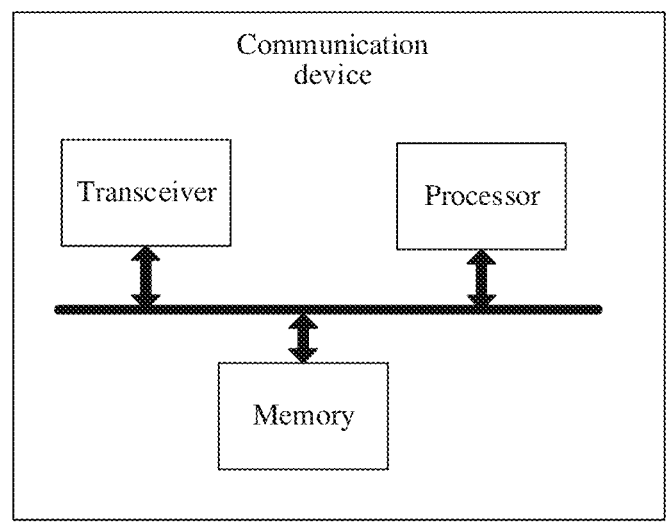
FIG. 11 is a schematic diagram of a structure of a communication device according to an embodiment of the present invention.

Specific hardware structures of the network devices in the foregoing embodiments, such as the SF device, the vBNP-CP device, the vBNP-UP device, the SDN controller, the USF device, and the AN device, may be shown in FIG. 11, and include a transceiver, a processor, and a memory. For example, the transceiver is configured to receive a packet, the memory is configured to store instructions, and the processor is configured to invoke the instructions in the memory, so that each communication device performs related processing steps of the communication device in the foregoing method embodiment.

Figure 12:
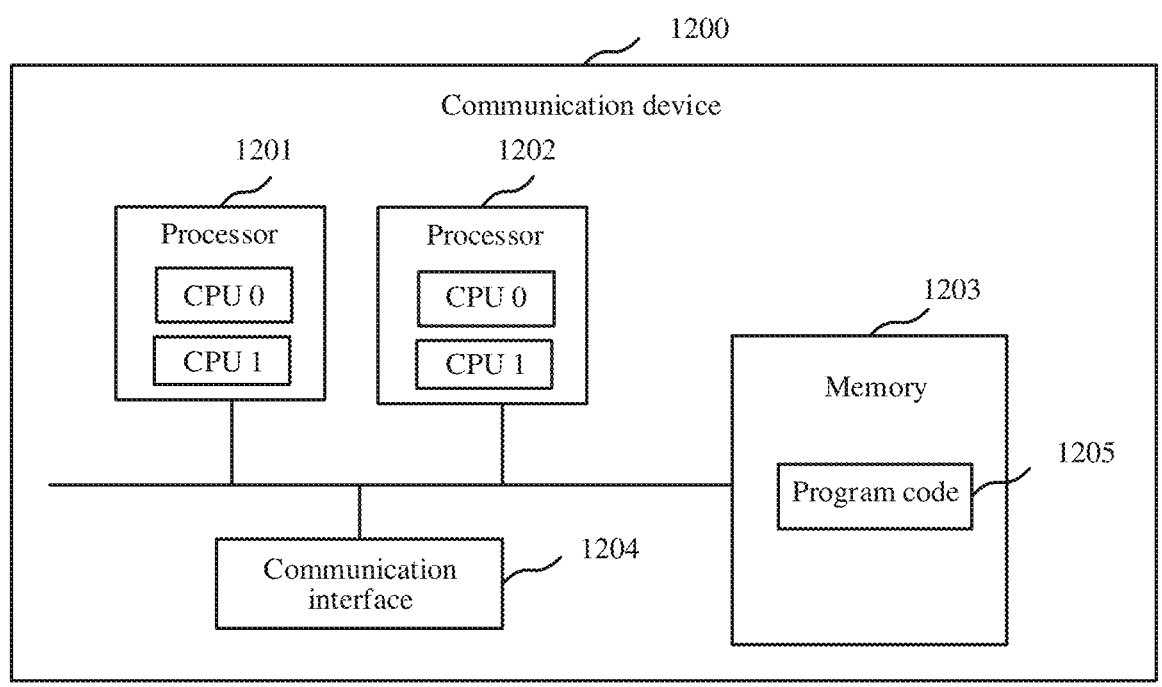
FIG. 12 is a schematic diagram of a structure of a communication device according to an embodiment of the present invention.

FIG. 12 is a schematic diagram of a structure of a communication device 1200 according to an example embodiment of this application. The communication device 1200 shown in FIG. 12 is configured to perform operations related to the communication methods shown in FIG. 3A and FIG. 3B, FIG. 4, and FIG. 6. The communication device 1200 is, for example, a switch or a router.

As shown in FIG. 12, the communication device 1200 includes at least one processor 1201, a memory 1203, and a communication interface 1204. There may be one or more communication interfaces 1204.

The processor 1201 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 1201 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor 1201 may implement or execute various logical blocks, modules, and circuits described with reference to content disclosed in embodiments of the present invention. Alternatively, the processor may be a combination of processors implementing a computing function, for example, including a combination of one or more microprocessors, or a combination of a DSP and a microprocessor.

Optionally, the communication device 1200 further includes a bus. The bus is configured to transmit information between components of the communication device 1200. The bus may be a peripheral component interconnect (PCI for short) bus, an extended industry standard architecture (EISA for short) bus, or the like. Buses may be classified into an address bus, a data bus, a control bus, and the like. For ease of representation, only one thick line is for representing the bus in FIG. 12, but this does not mean that there is only one bus or only one type of bus. The components of the communication device 1200 in FIG. 12 may be connected in another manner in addition to being connected by using a bus. This embodiment of the present invention imposes no limitation on a connection manner of the components.

The memory 1203 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 1203 exists independently, and is connected to the processor 1201 by using the bus. The memory 1203 may be alternatively integrated with the processor 1201.

The communication interface 1204 uses any apparatus such as a transceiver, and is configured to communicate with another device or a communication network. The communication network may be the Ethernet, a radio access network (RAN), a wireless local area network (WLAN), or the like. The communication interface 1204 may include a wired communication interface, and may further include a wireless communication interface. Specifically, the communication interface 1204 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 1204 may be used by the communication device 1200 to communicate with another device.

In specific implementation, in an embodiment, the processor 1201 may include one or more CPUs, for example, a CPU 0 and a CPU 1 shown in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

In specific implementation, in an embodiment, the communication device 1200 may include a plurality of processors, for example, a processor 1201 and a processor 1205 shown in FIG. 12. Each of the processors may be a single-core processor (single-CPU) or a multi-core processor (multi-CPU). The processor herein may be one or more devices, circuits, and/or processing cores configured to process data (for example, computer program instructions).

In specific implementation, in an embodiment, the communication device 1200 may further include an output device and an input device. The output device communicates with the processor 1201, and may display information in a plurality of manners. For example, the output device may be a liquid crystal display (LCD), a light emitting diode (LED) display device, a cathode ray tube (CRT) display device, or a projector. The input device communicates with the processor 1201, and may receive a user input in a plurality of manners. For example, the input device may be a mouse, a keyboard, a touchscreen device, or a sensing device.

In some embodiments, the memory 1203 is configured to store program code 1210 for executing the solutions of this application, and the processor 1201 may execute the program code 1210 stored in the memory 1203. In other words, the communication device 1200 may implement, by using the processor 1201 and the program code 1210 in the memory 1203, the communication method provided in the method embodiment. The program code 1210 may include one or more software modules. Optionally, the processor 1201 may store program code or instructions for executing the solutions of this application.

In a specific embodiment, the communication device 1200 in this embodiment of this application may correspond to the SF device, the USF device, the CP device, the UP device, or the SDN controller in the foregoing method embodiments. The processor 1201 in the communication device 1200 reads the program code 1210 in the memory 1203 or the program code or instructions stored in the processor 1201, to enable the communication device 1200 shown in FIG. 12 to perform all or some operations performed by the SF device, the USF device, the CP device, the UP device, or the SDN controller.

The communication device 1200 may further correspond to the apparatus shown in any one of FIG. 7 to FIG. 10, and each functional module in the apparatus shown in any one of FIG. 7 to FIG. 10 is implemented by using software of the communication device 1200. In other words, the functional modules included in any one of the apparatuses shown in FIG. 7 to FIG. 10 are generated after the processor 1201 of the communication device 1200 reads the program code 1210 stored in the memory 1203.

The steps of the data transmission methods shown in FIG. 3A and FIG. 3B, FIG. 4, and FIG. 6 are completed by using a hardware integrated logical circuit in a processor of the communication device 1200 or instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

The methods or algorithm steps described with reference to the content disclosed in embodiments of the present invention may be implemented by hardware, or may be implemented by a processor by executing software instructions. The software instructions may include corresponding software modules. The software module may be stored in a random access memory (RAM), a flash memory, a read-only memory (ROM), an erasable programmable read-only memory (EPROM), an electrically erasable programmable read-only memory (electrically EPROM, EEPROM), a hard disk, a removable hard disk, a compact disc, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

A person skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A network device, comprising:
   at least one processor; and
   one or more memories coupled to the at least one processor and storing programming instructions that are executable by the at least one processor, and when executed, cause the network device to act as a virtual broadband network gateway control plane (vBNG-CP) device in a virtual broadband network gateway (vBNG), and wherein the programming instructions include instructions to:
   receive a third packet sent by a first user plane LUPI device, wherein the third packet comprises a first location identifier, the first location identifier comprises an identifier of a steering function (SF1 device and an identifier of a first physical port, and the first physical port is a port, on the SF device, that receives a first packet sent by first user equipment;
   obtain user online information of the first user equipment, wherein the user online information comprises a traffic quality requirement and the first location identifier;
   obtain an identifier of a second virtual broadband network gateway user plane (vBNG-UP) device in the vBNG that meets the traffic quality requirement and that is determined based on the user online information; and
   deliver a user entry corresponding to the first user equipment to the second vBNG-UP device.

2. The network device according to claim 1, wherein a user plane steering function fUSFI device is comprised in the vBNG-CP device, and the second vBNG-UP device is determined by the USF device.

3. The network device according to claim 1, wherein the programming instructions further include instructions to:
   send the user online information of the first user equipment to a user plane steering function (USF1 device; and
   receive the identifier of the second vBNG-UP device from the USF device.

4. The network device according to claim 1, wherein the identifier of the first physical port comprises a slot identifier of the SF device and/or a subcard identifier of the SF device, and a port identifier of the SF device.

5. The network device according to claim 1, wherein a physical port corresponding to a second sub-interface corresponding to the second vBNG-UP device is the same as the first physical port, or a physical port corresponding to the second sub-interface and the first physical port are different physical ports on the SF device, or a physical port corresponding to the second sub-interface and the first physical port are physical ports on different SF devices.

6. The network device according to claim 1, wherein the programming instructions further include instructions to:
   send an identifier of the second vBNG-UP device to a software-defined networking LSDNI controller.

7. The network device according to claim 6, wherein the programming instructions further include instructions to:
   send the identifier of the second vBNG-UP device and/or a second location identifier to the SDN controller, wherein the second location identifier comprises an identifier of a second sub-interface of the second vBNG-UP device.

8. A network device, comprising:
   at least one processor;
   one or more memories coupled to the at least one processor and storing programming instructions, wherein the programming instructions are executable by the at least one processor, and when executed, cause the network device to act as a user plane steering function fUSF) device, wherein the programming instructions include instructions to:
   receive user online information of first user equipment sent by a control plane f CP) device, wherein the user online information comprises a traffic quality requirement, a virtual local area network identifier, and a first location identifier, and the first location identifier comprises an identifier of a steering function (SF) device and an identifier of a first physical port on the SF device;
   determine, based on the user online information, a second UP device meeting the traffic quality requirement, and return an identifier of the second UP device to the CP device; and
   send the identifier of the second UP device to a software-defined networking f SDN) controller.

9. The network device according to claim 8, wherein the identifier of the first physical port comprises a slot identifier of the SF device and/or a subcard identifier of the SF device, and a port identifier of the SF device.

10. The network device according to claim 8, wherein the identifier of the second UP device comprises a second location identifier, and the second location identifier comprises an identifier of a second sub-interface of the second UP device.

11. The network device according to claim 8, wherein a physical port corresponding to a second sub-interface of the second UP device is the same as the first physical port, or a physical port corresponding to the second sub-interface and the first physical port are different physical ports on the SF device, or a physical port corresponding to the second sub-interface and the first physical port are physical ports on different SF devices.

12. A communication system comprising:
    a virtual broadband network gateway (vBNG) connprising at least one processor and one or more memories coupled to the at least one processor and storing programming instructions, wherein the programming instructions are executable by the at least one processor, and wherein the vBNG comprises a virtual broadband network gateway control plane (vBNG -CP) device and at least one virtual broadband network gateway user plane (vBNG-UP) device;
    wherein the vBNG-CP is configured to:
    receive a third packet sent by a first user plane (UP) device, wherein the third packet comprises a first location identifier, the first location identifier comprises an identifier of a steering function (SF) device and an identifier of a first physical port, and the first physical port is a port, on the SF device, that receives a first packet sent by first user equipment;
    obtain user online information of the first user equipment, wherein the user online information comprises a traffic quality requirement and the first location identifier;
    obtain an identifier of a second virtual broadband network gateway user plane (vBNG -UP) device in the vBNG that meets the traffic quality requirement and that is determined based on the user online information; and deliver a user entry corresponding to the first user equipment to the second vBNG -UP device.

13. The communication system according to claim 12, wherein a user plane steering function fUSF1 device is comprised in the vBNG-CP device, and the second vBNG-UP device is determined by the USF device.

14. The communication system according to claim 12, further comprising:
a USF device; and
the vBNG-CP is further configured to:
send the user online information of the first user equipment to the USF device; and
receive the identifier of the second vBNG-UP device from the USF device.

15. The communication system according to claim 14, wherein the USF device is configured to:
receive the user online information of first user equipment sent by the vBNG-CP;
determine, based on the user online information, the second vBNG-UP device meeting the traffic quality requirement, and returning an identifier of the second vBNG-UP device to the CP device; and
send the identifier of the second vBNG-UP device to a software-defined networking (SDN) controller.

16. The communication system according to claim 15, wherein the USF device is further configured to:
send a second location identifier to the SDN controller; and
wherein the second location identifier comprises an identifier of a second sub-interface of the second vBNG-UP device in the vBNG.

17. The communication system according to claim 14, wherein the identifier of the first physical port comprises a slot identifier of the first physical port and/or a subcard identifier the first physical port, and a port identifier the first physical port.

18. The communication system according to claim 12, wherein the identifier of the first physical port comprises a slot identifier of the first physical port and/or a subcard identifier of the first physical port, and a port identifier of the first physical port.

19. The communication system according to claim 12, wherein a physical port corresponding to a second sub-interface corresponding to the second vBNG-UP device of the vBNG is the same as the first physical port, or a physical port corresponding to the second sub-interface and the first physical port are different physical ports on the SF device, or a physical port corresponding to the second sub-interface and the first physical port are physical ports on different SF devices.

20. The communication system according to claim 12, wherein the communication system further comprises a software-defined networking fSDN1 controller, and the vBNG-CP is further configured to:
send the identifier of the second vBNG-UP device to the SDN controller.

* * * * *

UNITED STATES PATENT AND TRADEMARK OFFICE
CERTIFICATE OF CORRECTION

PATENT NO.        : 11,909,624 B2
APPLICATION NO.   : 18/309146
DATED             : February 20, 2024
INVENTOR(S)       : Peng et al.

Page 1 of 1

It is certified that error appears in the above-identified patent and that said Letters Patent is hereby corrected as shown below:

In the Claims

In Column 21, in Claim 1, Line 18, delete "LUPI" and insert -- (UP) --.

In Column 21, in Claim 1, Line 21, delete "(SF1" and insert -- (SF) --.

In Column 21, in Claim 2, Line 35, delete "fUSFI" and insert -- (USF) --.

In Column 21, in Claim 3, Line 41, delete "(USF1" and insert -- (USF) --.

In Column 21, in Claim 6, Line 60, delete "LSDNI" and insert -- (SDN) --.

In Column 22, in Claim 8, Line 8, delete "fUSF)" and insert -- (USF) --.

In Column 22, in Claim 8, Line 11, delete "f CP)" and insert -- (CP) --.

In Column 22, in Claim 8, Line 23, delete "f SDN)" and insert -- (SDN) --.

In Column 22, in Claim 12, Lines 42-43, delete "connprising" and insert -- comprising --.

In Column 22, in Claim 12, Line 48, delete "(vBNG -CP)" and insert -- (vBNG-CP) --.

In Column 22, in Claim 12, Line 64, delete "(vBNG -UP)" and insert -- (vBNG-UP) --.

In Column 23, in Claim 12, Line 2, delete "vBNG -UP" and insert -- vBNG-UP --.

In Column 23, in Claim 13, Line 4, delete "fUSF1" and insert -- (USF) --.

In Column 24, in Claim 20, Line 25, delete "fSDN1" and insert -- (SDN) --.

Signed and Sealed this
Thirtieth Day of April, 2024

Katherine Kelly Vidal
*Director of the United States Patent and Trademark Office*